| (12) United States Patent<br>Sciancalepore et al. | (10) Patent No.: US 10,268,100 B2<br>(45) Date of Patent: Apr. 23, 2019 |
|---|---|

(54) OPTOELECTRONIC DEVICE FOR GENERATION A FREQUENCY COMB

(71) Applicant: Commissariat a l'energie atomique et aux energies alternatives, Paris (FR)

(72) Inventors: Corrado Sciancalepore, Lyons (FR); Marco Casale, Paris (FR); Houssein El Dirani, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 15/923,571

(22) Filed: Mar. 16, 2018

(65) Prior Publication Data

US 2018/0307118 A1 Oct. 25, 2018

(30) Foreign Application Priority Data

Mar. 17, 2017 (FR) .................................. 17 52226

(51) Int. Cl.
*G02F 1/39* (2006.01)
*G02F 1/35* (2006.01)
*G02F 1/365* (2006.01)

(52) U.S. Cl.
CPC ............ *G02F 1/395* (2013.01); *G02F 1/3536* (2013.01); *G02F 1/365* (2013.01); *G02F 2001/392* (2013.01); *G02F 2201/04* (2013.01); *G02F 2201/58* (2013.01); *G02F 2202/101* (2013.01); *G02F 2202/102* (2013.01); *G02F 2203/15* (2013.01); *G02F 2203/17* (2013.01); *G02F 2203/56* (2013.01)

(58) Field of Classification Search
CPC ............................ G02F 1/395; G02F 2203/56
See application file for complete search history.

(56) References Cited

U.S. PATENT DOCUMENTS

| 8,519,803 | B2* | 8/2013 | McLaren | .............. | H01P 1/2084 |
| | | | | | 333/17.1 |
| 9,195,113 | B2* | 11/2015 | Cox | ....................... | G02F 1/3536 |
| 9,490,605 | B2* | 11/2016 | Gaeta | ................... | H01S 3/06791 |

(Continued)

FOREIGN PATENT DOCUMENTS

WO WO 2018081824 A1 * 5/2018 ............... G02F 1/35

OTHER PUBLICATIONS

French Preliminary Search Report dated Jan. 17, 2018 in French Application 17 52226 filed on Mar. 17, 2017 (with Written Opinion and Translation of Categories Cited).

(Continued)

*Primary Examiner* — Daniel Petkovsek

(74) *Attorney, Agent, or Firm* — Oblon, McClelland, Maier & Neustadt, L.L.P.

(57) ABSTRACT

The invention relates to an optoelectronic device for generating a frequency comb comprising a laser source (2), a ring microresonator (3) comprising a resonant ring (20) made of a third order optically non-linear material with abnormal dispersion regime. It also comprises a spectral tuning device comprising a junction guide (30) coupled to the resonant ring, electrical biasing means (40) adapted to apply an electrical voltage to the junction, and a control unit (42) adapted to modify the value of the electrical voltage until at least one dissipative temporal soliton is formed in the resonant ring.

15 Claims, 5 Drawing Sheets

(56) References Cited

U.S. PATENT DOCUMENTS

2016/0011489 A1  1/2016  Herr et al.
2018/0196198 A1* 7/2018  Casale .................... G02F 1/365

OTHER PUBLICATIONS

Mohammad Soltani et al. "Enabling arbitrary wavelength frequency combs on chip," Laser & Photonics Reviews,10 , No. 1, 2016, pp. 5.
Hojoong Jung et al. Electrical tuning and switching of an optical frequency comb generated in aluminum nitride microring resonators, Optics Letters , vol. 39, No. 1, 2014, pp. 4.
G.T. Reed et al. "Silicon optical modulators," Nature Photonics, vol. 4, 2010, pp. 10.
Xiaoxiao Xue et al., "Thermal tuning of Kerr frequency combs in silicon nitride microring resonators," Optics Express, vol. 24., No. 1, 2016, pp. 12.
Steven A. Miller et al. "Tunable frequency combs based on dual microring resonators", Optics Express, vol. 23, No. 16, 2015, pp. 14.
Xuezhi Zhang et al., "Mid-infrared frequency comb generation in coupled silicon microring resonators," Optics Communications, vol. 332, 2014, pp. 7.
T. Herr et al. "Temporal solitons in optical microresonators" Nature Photonics, vol. 8, 2014, pp. 8.

* cited by examiner

OPTOELECTRONIC DEVICE FOR GENERATION A FREQUENCY COMB

TECHNICAL FIELD

The field of the invention is that of the optoelectronic devices for generating a quasi-coherent or coherent frequency comb by the formation of Kerr-type dissipative temporal solitons.

PRIOR ART

There are optoelectronic devices which make it possible to generate frequency combs. A frequency comb is a representation of an optical signal in the frequency domain whose spectrum is composed of a discrete sum of frequencies. The amplitude can be weighted by a spectral envelope centered around the frequency $w_p$ of a pump signal. Such optoelectronic devices are applicable in particular in the field of optical telecommunications, for example the coherent data transmission networks, signal generation, rapid spectroscopy, even temporal reference systems.

Figure 1A:
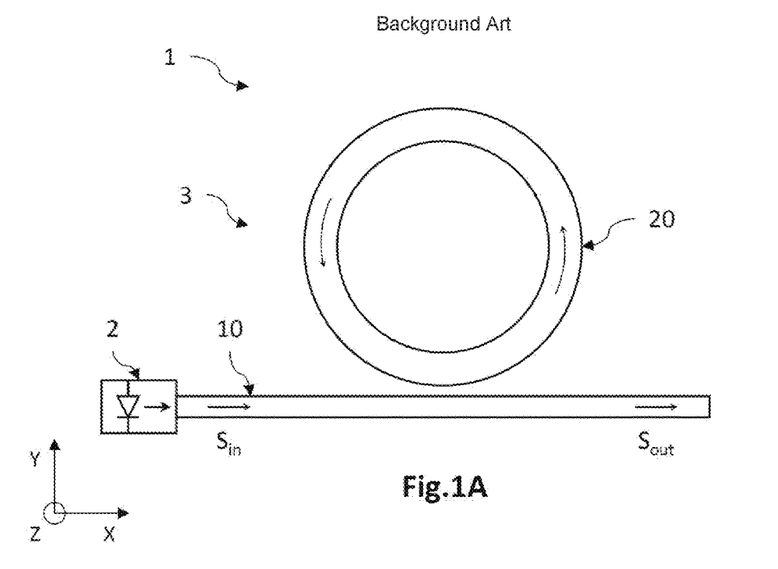
FIG. 1A is a plan view, schematic and partial, of an optoelectronic device for generating a frequency comb according to an example of the prior art.

FIG. 1A illustrates an example of such an optoelectronic device 1, described in the publication by Levy et al. entitled *CMOS-compatible multiple-wavelength oscillator for on-chip optical interconnects*, Nature Photon. 4, 37-40 (2010), this optoelectronic device 1 being produced by CMOS-type microelectronic methods. It comprises a laser source 2 and a ring optical microresonator 3. The laser source 2 is adapted to emit a so-called pump optical signal $S_{in}$, continuous and monochromatic of wavelength $\lambda_p$. The microresonator 3 comprises a coupling waveguide 10 having an input coupled to the laser source 2 and an output which supplies an optical signal $S_{out}$ whose spectrum forms the frequency comb generated. It also comprises an optical cavity formed by a ring waveguide 20, called resonant ring, produced in a material with third order non-linear optical properties, here silicon nitride SiN.

Figure 1B:
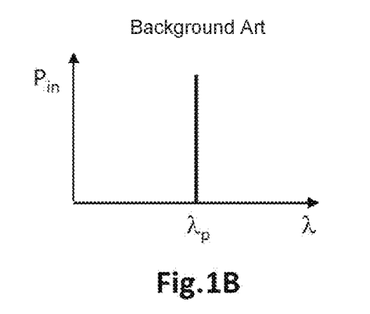
FIGS. 1B and 1C respectively illustrate an example of wavelength spectrum of the pump optical signal and an example of frequency comb generated.
Figure 1C:
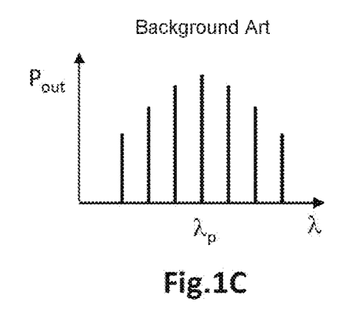

The optical microresonator 3 forms an optical parametric oscillator. The pump signal $S_{in}$, whose spectrum is represented in FIG. 1B, is coupled resonantly by evanescent wave to a fundamental mode of the resonant ring 20. In as much as the material of the resonant ring 20 is optically non-linear of order three, that is to say that it has a third order electrical susceptibility, a so-called cascaded four-wave mixing occurs which generates, from the fundamental mode supported by the resonant ring 20, a frequency comb of which an example is represented in FIG. 1C. Moreover, in as much as such an optical microresonator 3 exhibits a high figure of merit Q, it is not necessary for the power of the pump signal to be great for the parametric gain to be greater than the optical losses present in the resonant ring 20, which makes it possible to initiate the amplification of the waves generated.

The publication by Herr et al. entitled *Temporal solitons in optical microresonators*, Nature Photon. 8, 145-152 (2014), describes another example of an optoelectronic device that makes it possible to generate a frequency comb by cascaded four-wave mixing, in which the resonant ring is produced in a material with optical Kerr effect, more specifically in $MgF_2$, and exhibits an abnormal dispersion regime at the pump wavelength $\lambda_p$. Because of the abnormal dispersion and the non-linear properties of the third order of the material of the resonant ring, one or more so-called Kerr dissipative temporal solitons can be formed, which render the frequency comb generated quasi-coherent or coherent.

Figure 1D:
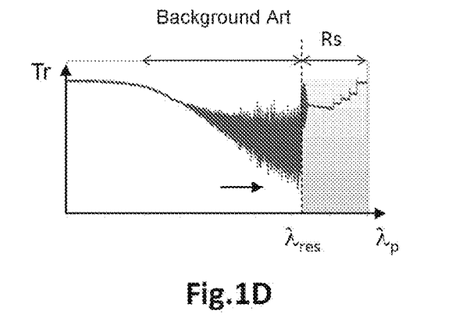
FIG. 1D illustrates an example of resonance spectrum in non-lorentzienne form of a resonant ring produced in a third order non-linear material.

However, as explained by Herr 2014, the non-linear optical effects of the material of the resonant ring provoke a shift of the resonance wavelength $\lambda_{res}$ toward the great wavelengths. Furthermore, the frequency scanning of the resonance shows that the latter exhibits a form that is no longer lorentzienne but of triangular type, an example of which is represented in FIG. 1D.

Herr 2014 shows that it is possible to form dissipative temporal solitons, which render the frequency comb generated quasi-coherent or coherent, by performing a scanning of the resonance by the pump frequency. In effect, during the frequency scan, the pump laser switches from a spectral tuning in the optical cavity in the blue (blue-detuning) for which the pump frequency $w_p$ is greater than the effective resonance frequency $w_{res}$, to a spectral tuning in the red (red-detuning) for which the pump frequency $w_p$ is less than the effective resonance frequency $w_{res}$, which then leads to the formation of temporal solitons. The presence of the solitons can be revealed in particular from the value Tr of the optical transmission signal which exhibits, in red-detuning regime, discrete transitions as the pump frequency $w_p$ decreases, these transitions reflecting the reduction of the number of solitons being propagated in the optical cavity. The frequency comb in solitonic regime also exhibits a greatly reduced noise, its spectral envelope becomes of sin $h^2$ type when the comb is fully coherent (a single soliton in the optical cavity).

The optoelectronic device for generating a quasi-coherent or coherent frequency comb described by Herr 2014 does however present the drawback of having to perform a particularly fine spectral tuning of the pump signal to the resonant mode to obtain the solitonic regime Rs, which necessitates the use of a laser source that is costly, bulky and therefore difficult to integrate.

SUMMARY OF THE INVENTION

The aim of the invention is to at least partly remedy the drawbacks of the prior art, and more particularly to propose an optoelectronic device for generating a frequency comb that allows for a simplified spectral tuning between the pump signal and a resonant mode in order to form dissipative temporal solitons.

For that, the object of the invention is an optoelectronic device for generating a frequency comb comprising: a laser source adapted to emit a so-called pump optical signal, continuous and monochromatic, of a time-constant pump wavelength; and a ring optical microresonator, comprising:
- a so-called coupling waveguide, comprising an input optically coupled to the laser source, and an output intended to supply the generated frequency comb;
- a first ring waveguide, called resonant ring, coupled optically to the coupling waveguide to generate an optical mode in the resonant ring at a resonance wavelength, and formed in a third order optically non-linear material which exhibits a refractive index and transverse dimensions such that the resonant ring exhibits an abnormal dispersion regime associated with said optical mode.

The optoelectronic device also comprises a spectral tuning device adapted to tune the resonance wavelength relative to the pump wavelength to form at least one dissipative temporal soliton in the resonant ring, comprising:
- a second ring waveguide, called junction guide, arranged facing the resonant ring so as to be longitudinally coupled optically to the latter, formed in a material whose refractive index exhibits a deviation with respect to that of the core material of the resonant ring allowing the modal coupling between the two waveguides, and comprising a semiconductor junction extending parallel to the resonant ring;

electrical biasing means adapted to apply a semiconductor junction biasing voltage;

a control unit, connected to the biasing means and coupled optically to the output, adapted to modify the value of the voltage to cause a modification of an effective index of the optical mode and therefore of the resonance wavelength, until at least one dissipative temporal soliton is formed in the resonant ring.

Longitudinal optical coupling of the second waveguide with the resonant ring should be understood to mean that the optical coupling is produced along the longitudinal axis of the second waveguide. Moreover, semiconductor junction which extends parallel to the resonant ring should be understood to mean that the junction extends along a longitudinal axis, which is locally parallel to that of the resonant ring. The resonant ring and the junction guide are superposed on one another. They can be coaxial, and preferably have a longitudinal form substantially identical to one another.

Some preferred but nonlimiting aspects of this optoelectronic device are as follows.

The control unit can be adapted to detect an optical signal at the output, to determine a value of a parameter thereof that is representative of a spectral tuning between the pump signal and an optical mode of the resonant ring at the value of the voltage applied, and to induce a modification of the value of said voltage applied until the value of said parameter reaches a reference value representative of the presence of at least one dissipative temporal soliton in the resonant ring.

The material of the junction guide can be silicon.

The material of the resonant ring can be a III-V semiconductor compound, a IV element or a IV compound, even a IV-V compound.

The material of the resonant ring can be chosen from AlGaAs, GaAs, GaAsP, InGaP, InGaAsP, InGaAs.

The resonant ring can be single-mode at the resonance wavelength.

The difference between the refractive indexes of the resonant ring and of the junction guide can be less than or equal to 0.5.

A mean distance separating the resonant ring and the junction guide, along an axis orthogonal to the plane on which the resonant ring extends, can lie between 75 nm and 200 nm.

A mean width of the junction guide can be less than that of the resonant ring.

The mean width of the junction guide can lie between 200 nm and 500 nm and that of the resonant ring can lie between 400 nm and 800 nm.

The materials of the resonant ring and of the junction guide can be surrounded by a silicon oxide cladding.

The invention relates also to a method for generating a frequency comb by an optoelectronic device according to any one of the preceding features, comprising the following steps:

a) emission by the laser source (2) of a monochromatic and continuous pump signal at a time-constant pump wavelength ($\lambda_p$), said pump wavelength ($\lambda_p$) being chosen to form an optical mode in the resonant ring (20) at the resonance wavelength ($\lambda_{res}$);

b) biasing of the semiconductor junction by a non-zero voltage (U), so as to provoke a modification of the concentration of the charge carriers within the junction guide (30), being reflected by a modification of the effective index of the optical mode present in the resonant ring (20) and therefore of the resonance wavelength ($\lambda_{res}$);

c) detection of an optical signal at the output (12), and determination, from the optical signal detected, of a value of a parameter representative of a spectral tuning between the pump signal and the optical mode of the resonant ring (20);

d) modification of the value (U) of the biasing voltage, until the determined value of said representative parameter reaches a reference value representative of the presence of at least one dissipative temporal soliton in the resonant ring (20).

At a so-called initial value of the biasing voltage, the pump wavelength can be less than the resonance wavelength.

In the step d), the modification of the value of the biasing voltage relative to the initial value can lead to a reduction of the resonance wavelength until it is less than the pump wavelength.

It is possible to determine the value of an optical transmission of the optical microresonator, the reference value being a minimum value of the optical transmission when the value of the biasing voltage increases.

BRIEF DESCRIPTION OF THE DRAWINGS

Other aspects, aims, advantages and features of the invention will become more apparent on reading the following detailed description of preferred embodiments thereof, given by way of nonlimiting example, and with reference to the attached drawings, in addition to FIGS. 1A-1D already described, in which:

FIGS. 3A to 3C illustrate a first spectral tuning step in which the biasing voltage applied exhibits a non-zero so-called initial value $U_{init}$; FIG. 3A being a view in transverse cross section of the resonant ring and of the junction guide, FIG. 3B a spectrum of the optical transmission signal exhibiting a spectral tuning in the blue (blue-detuning), and FIG. 3C a frequency comb generated reflecting the absence of dissipative temporal solitons;

FIGS. 4A to 4C illustrate a subsequent spectral tuning step in which the biasing voltage exhibits a lower value, as an absolute value, than the initial value $U_{init}$, for which the solitonic regime Rs is obtained; FIG. 4A being a view in transverse cross section of the resonant ring and of the junction guide, FIG. 4B a spectrum of the optical transmission signal exhibiting a spectral tuning in the red (red-detuning), and FIG. 4C the frequency comb generated, the latter being quasi-coherent or coherent by virtue of the presence of several or just one dissipative temporal solitons;

DETAILED EXPLANATION OF PARTICULAR EMBODIMENTS

In the figures and hereinafter in the description, the same references represent identical or similar elements. In addition, the different elements are not represented to scale so as to prioritize the clarity of the figures. Moreover, the different embodiments and variants are not mutually exclusive and can be combined with one another. Unless otherwise indicated, the terms "substantially", "approximately", "of the order of" mean to within 10%.

The invention relates to an optoelectronic device for generating a quasi-coherent or coherent frequency comb. It comprises an optical microresonator which forms an optical parametric oscillator, in which a frequency comb is generated by a third order non-linear phenomenon of cascaded four-wave mixing, associated with the formation of Kerr-type dissipative temporal solitons. The frequency comb is said to be quasi-coherent when the frequency lines are partially phase-related with one another, reflecting the presence of several temporal solitons. It is said to be coherent, or fully coherent, when all the frequency lines are in mutual phase relationship, which is the case when a single temporal soliton is present in the optical cavity. The operating regime of the frequency comb generator is said to be solitonic Rs when one or more temporal solitons are present.

An optical parametric oscillator is a coherent light source which relies on a parametric amplification in an optical resonator. The optical resonator here comprises an optical cavity produced in a third order non-linear medium, that is to say one comprising a third order electrical susceptibility $\chi^{(3)}$, allowing a cascaded four-wave mixing to take place, thus generating a frequency comb.

The cascaded four-wave mixing is a third order non-linear phenomenon in which two photons of pump frequency $w_p$ are converted without energy loss into a photon called frequency signal $w_s$ and a so-called complementary (or idler) photon of frequency $w_c$. It is called cascaded in as much as the photons generated are also the origin of the generation of other signal and complementary photons by four-wave mixing.

The optical Kerr effect is a third order non-linear phenomenon which expresses the dependence of the refractive index of a medium with respect to the intensity of the optical signal which passes through it. This dependence can be formalized by the relationship: $n=n_0+n_2 \cdot I$ in which n is the refractive index of the material, $n_0=(1+\chi^{(1)})^{1/2}$ is the linear refractive index, in which $\chi^{(1)}$ is the first order electrical permittivity, $n_2$ is the non-linear index which depends on the third order electrical permittivity $\chi^{(3)}$, and I is the intensity of the optical signal which passes through the medium.

As detailed later, to allow the formation of the Kerr dissipative temporal solitons, the optical cavity of the microresonator is produced in a material with optical Kerr effect, whose refractive index and optogeometric dimensions are chosen to exhibit an abnormal dispersion regime associated with the fundamental optical mode that it supports. As detailed later, the refractive index can be high, for example close to that of silicon, such that the ring waveguide exhibits transverse dimensions such that it is then single-mode.

The dispersion is said to be abnormal when the dispersion parameter D is positive. This parameter D, expressed in ps/(nm·km), is defined as the product of a quantity $\beta_2$ and of $-2\pi c/\lambda_{res}^2$, in which $\lambda_{res}$ is the wavelength of the fundamental mode supported by the resonant ring to which the pump signal is tuned, which is less than the pump wavelength $\lambda_p$ when the solitonic regime is reached. The quantity $\beta_2$, also called group velocity dispersion (GVD), corresponds to the fact that group velocity of the optical signal is dependent on the wavelength of the signal. This quantity $\beta_2$ is defined as being equal to the derivative of the inverse of the group velocity of the optical signal:

$$\beta_2 = \frac{\partial 1}{\partial w v_g}$$

in which $v_g$ is the group velocity of the optical signal considered, w the frequency. In other words, it corresponds to the second derivative of $\beta(w)$ relative to w, at the resonance wavelength, in which $\beta(w)$ is the propagation constant which depends on the opto-geometric characteristics of the waveguide and on the spatial distribution of the optical field of the associated mode.

The optoelectronic device comprises several waveguides. Generally, each waveguide has a bottom face and an opposite top face, and rests on a support at the bottom face level, and has lateral flanks which extend from the top face to the bottom face. It thus has transverse height and width dimensions. Height should be understood to mean the mean distance of the waveguide, and more specifically of the so-called core material, along the axis Z orthogonal to the plane of the support, between the bottom and top faces. Width should be understood to mean the mean distance between the lateral flanks of the waveguide, and more specifically of the core material, in a plane parallel to the plane of the support. The height and the width are preferably substantially constant along the longitudinal extent of the waveguide.

Figure 2A:
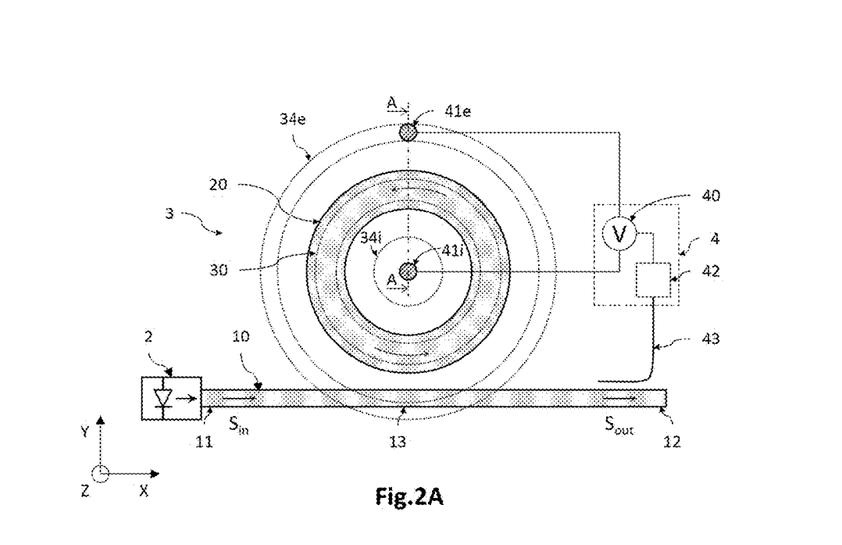
FIG. 2A is a plan view; schematic and partial, of an optoelectronic device for generating a frequency comb according to an embodiment.
Figure 2B:
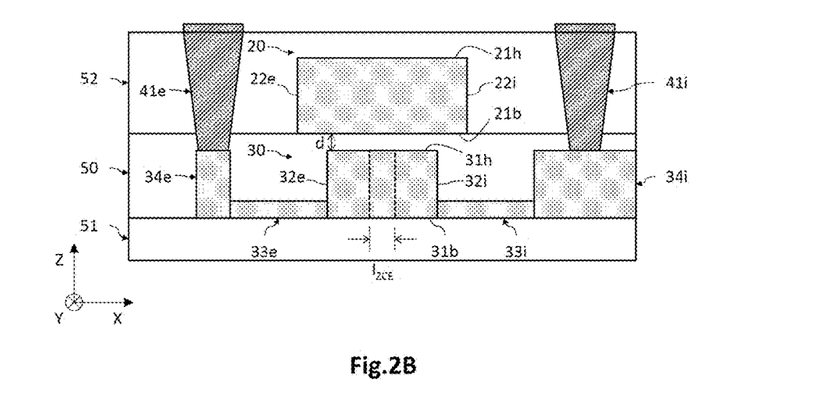
FIG. 2B is a view in transverse cross section of the resonant ring and of the junction guide along the cutting plane A-A.

FIG. 2A is a plan view, schematic and partial, of an optoelectronic device 1 for generating a frequency comb according to an embodiment, adapted to supply a quasi-coherent or coherent comb. This optoelectronic device 1 comprises a laser source 2 adapted to emit a continuous monochromatic optical signal, a ring optical microresonator 3, and a spectral tuning device 4 adapted to perform the spectral tuning of the resonant mode with the pump signal by modifying the effective index of the resonant mode supported by the microresonator 3, so as to obtain the solitonic regime Rs. FIG. 2B is a view in transverse cross-section of the resonant ring 20 and of the junction guide 30 on a plane A-A illustrated in FIG. 2A.

Hereinafter in the description, a three-dimensional orthogonal reference frame (X,Y,Z) is defined in which the axes X and Y form a plane parallel to the planes on which the waveguides of the optoelectronic device rest, and in which the axis Z is oriented according to the thickness dimension of the waveguides.

The laser source 2 is adapted to emit a so-called pump optical signal $S_{in}$. This optical signal is continuous and monochromatic, of wavelength $\lambda_p$. The pump wavelength $\lambda_p$ is then substantially constant in time. It is chosen to be able to resonantly excite a fundamental mode supported by the resonant ring 20 of the optical microresonator 3. As an example, it can be equal to approximately 1.55 μm in the case of a so-called telecom application, even equal to approximately 1.31 μm for a so-called datacom application, even also be a wavelength of the visible or the infrared, in particular of the mid-infrared.

Figure 3A:
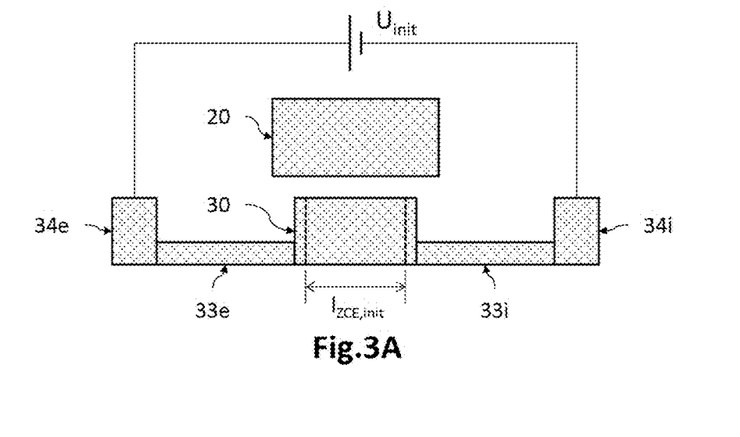
Figure 3B:
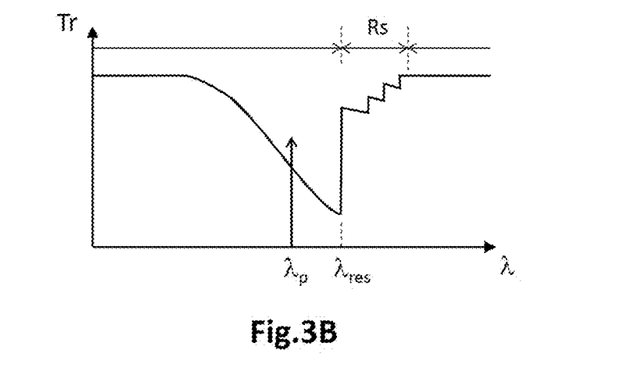

The pump wavelength $\lambda_p$ is provided to excite a fundamental mode of the resonant ring 20 but without the solitonic regime being initially reached. In effect, in as much as the resonant ring 20 is made of a material with third order non-linear effects, the effective resonance wavelength $\lambda_{res}$ is greater than the resonance linear wavelength (by virtue of the triangular non-lorentzienne form of the resonance spectrum), the pump wavelength $\lambda_p$ is initially less than the effective resonance wavelength $\lambda_{res}$, then being reflected by a spectral tuning in the blue (blue-detuning), as illustrated in FIG. 3B. The switch to the spectral tuning in the red (red-detuning) to address the solitonic regime Rs is performed by the spectral tuning device 4 described later.

Moreover, the power of the pump signal is chosen so as to be greater than the optical losses present in the optical microresonator 3, such that the parametric gain is greater than the optical losses and the amplification of the optical signal in the optical microresonator 3 can generate a frequency comb by cascaded four-wave mixing. The laser source 2 can be mounted on the layer of cladding 52 surrounding the coupling guide 10 and the resonant ring 20, even be incorporated inside this layer 52.

The ring optical microresonator 3 comprises a so-called coupling waveguide 10 and a first ring waveguide 20, called resonant ring.

The coupling waveguide 10 comprises an input 11 and an output 12, which also form the input and the output of the optical microresonator 3. The input 11 is coupled optically to the laser source 2 to receive the pump signal $S_{in}$ emitted thereby, and the output 12 is adapted to supply the frequency comb generated. It comprises a coupling zone 13 allowing an optical coupling to the resonant ring 20 by evanescent wave.

The coupling waveguide 10 is produced in a so-called core material, with high refractive index. More specifically, it comprises a core formed in a material with high refractive index surrounded by a cladding 52 formed in a material of low refractive index. The guide 10 rests on a surface of a support layer 50 whose material participates in forming the cladding. As an example, the core material of the guide 10 is preferably identical to that of the resonant ring 20, and can be chosen from the III-V semiconductor compounds comprising at least one element from column III and at least one element from column V of the periodic table, or from among the IV or IV-V semiconductor elements or compounds comprising at least one element from the column IV. As an example, the III-V compounds can be, among others, AlGaAs, GaAs, InGaAs, InGaAsP, InGaP. The IV or IV-V elements or compounds can be Si, even SiN such as $Si_3N_4$. The cladding material can, among others, be silicon oxide SiO, for example $SiO_2$.

The waveguide 10 extends longitudinally between the input 11 and the output 12, with any form. As an example, for a pump length $\lambda_p$ of 1.55 µm, the transverse dimensions of the waveguide 10 can range from a few hundreds of nanometers to several micrometers. The waveguide 10 can be single-mode or multimode. In this example, it is preferably single-mode and supports a mode of TE (transverse electric) type.

The first ring waveguide 20, called resonant ring, forms the optical cavity of the microresonator 3. As for any Kerr-type optical parametric oscillator, it comprises a third order non-linear material making it possible to generate optical waves of wavelength different from resonance wavelength by cascaded four-wave mixing. Furthermore, the resonant ring 20 is dimensioned and exhibits a refractive index such that the chromatic dispersion is abnormal for the resonant optical mode. Thus, it is possible to form one or more dissipative temporal solitons of Kerr type making it possible to render the frequency comb generated by the cascaded four-wave mixing quasi-coherent or coherent.

The resonant ring 20 is a waveguide in ring form. It comprises an optical coupling zone making it possible to be coupled by evanescent wave to the waveguide 10. It can extend in the form of a circle, an oval or the like. In this example, it exhibits a circular form whose radius r is defined from a longitudinal line running through the transverse barycenters of the resonant ring 20. Transverse barycenter should be understood to mean the barycenter associated locally with a transverse cross-section of the waveguide.

The resonant ring 20 is produced in a material of high index with third order non-linear optical properties. More specifically, it is produced in a so-called core material with high refractive index surrounded by a cladding produced in a material of low refractive index. The core material can be chosen from the III-V compounds with optical Kerr effect, or from the IV, or IV-V, elements or compounds with optical Kerr effect. Preferably, the core material of the resonant ring is AlGaAs, but it can also be GaAs, InGaAs, InGaAsP, InGaP, or other III-V compound with optical Kerr effect. The IV or IV-V elements or compounds can be Si, even SiN such as $Si_3N_4$. Furthermore, as will be specified later, the core material of the resonant ring 20 exhibits a refractive index, more specifically a linear refractive index, close to that of the material of the junction guide 30. Moreover, the cladding material can be, among others, silicon oxide SiO, for example $SiO_2$. The resonant ring 20 has a top face 21*h* and a bottom face 21*b* which rests on the support layer 50, and lateral flanks 22*i*, 22*e* which extend between the top 21*h* and bottom 21*b* faces. It has a thickness $e_{ga}$ and a width $I_{ga}$ that are substantially constant along its longitudinal extent. It rests on the same support layer 50 as the coupling waveguide 10 such that the bottom face 21*b* of the resonant ring 20 and that of the waveguide 10 are substantially coplanar.

The resonant ring 20 is adapted to be coupled optically to the waveguide 10. Thus, it is dimensioned for there to be phase tuning between the fundamental optical mode, here $TE_{00}$, supported by the waveguide 10 and the resonant optical mode, here $TE_{00}$, supported by the resonant ring 20. In other words, the propagation constant of the fundamental mode $TE_{00}$ supported by the resonant ring 20 is equal to the propagation constant of the fundamental mode $TE_{00}$ supported by the guide 10, which is reflected here by the quasi-equality or the equality between the effective index of the fundamental mode $TE_{00}$ supported by the resonant ring 20 with that of the fundamental mode $TE_{00}$ supported by the guide 10.

Generally, the effective index $n_{eff}$ associated with an optical mode supported by a waveguide is defined as the product of the propagation constant $\beta$ and of $\lambda/2\pi$. The propagation constant $\beta$ depends on the wavelength $\lambda$ of the optical mode, as well as on the properties of the waveguide (refractive index and transverse dimensions). The effective index of the optical mode corresponds, in a certain way, to the refractive index of the waveguide "seen" by the optical mode. It usually lies between the index of the core and the index of the cladding of the waveguide.

The resonant ring 20 is also adapted to ensure a parametric conversion of frequencies by cascaded four-wave mixing. For that, the material of the resonant ring 20, that is to say its so-called core material, exhibits non-linear optical properties allowing the optical Kerr effect, and thus exhibits a refractive index which depends on the intensity of the optical signal passing through it. Four-wave mixing by optical Kerr effect is then possible.

The resonant ring 20 is also adapted to form one or more so-called Kerr dissipative temporal solitons. By definition, a soliton is a solitary optical wave which is propagated without being deformed in a non-linear and dissipative medium. These solitons are said to be of Kerr type in as much as they are generated in a third order non-linear material by optical Kerr effect. In as much as the solitonic regime can appear only in an optical cavity where the dispersion is abnormal, the resonant ring is adapted such that the dispersion is abnormal for the resonant mode, here $TE_{00}$, supported by the resonant ring 20. For that, as shown in the publication by Okawachi et al entitled *Octave-spanning frequency comb generation in a silicon nitride chip*, Opt. Lett. 36, 3398 (2011), given the refractive index, that is to say, here, the linear index, of the material of the resonant ring 20, the transverse dimensions of height $e_{ar}$ and/or of width $I_{ar}$ of the resonant ring 20 are chosen such that the latter exhibits an abnormal dispersion regime associated with the fundamental mode, here $TE_{00}$. In the case where the core material is a III-V material with optical Kerr effect, such as AlGaAs, whose refractive index is higher, here of the order of approximately 3.4 to 1.55 μm, the chromatic dispersion is abnormal for the thickness and/or width dimensions of the resonant ring 20 such that the guide remains single-mode.

As an example, in the case of a pump wavelength $\lambda_p$ equal to approximately 1.55 μm, and for a core material of the resonant ring 20 in AlGaAs, the height $e_{ga}$ preferably lies between 300 nm and 500 nm, and the width $I_{ga}$ preferably lies between 400 nm and 800 nm. Thus, the optical mode supported by the resonant ring 20 exhibits an abnormal dispersion regime. These transverse dimensions make the resonant ring not multimode but rather single-mode, which thus makes it possible to discard the disturbances likely to degrade the formation of the temporal solitons because of interferences between optical modes, as described in the publication by Kordts et al., entitled *High order mode suppression in high-Q anomalous dispersion SiN microresonators for temporal dissipative Kerr soliton formation*, Opt. Lett. 41, 452 (2016).

The spectral tuning device 4 is adapted to modify the resonance wavelength $\lambda_{res}$ of the optical mode supported by the resonant ring 20 relative to the pump wavelength $\lambda_p$ maintained substantially constant over time, until the solitonic regime Rs is reached in the resonant ring 20. For that, it comprises a semiconductor junction waveguide 30, electrical biasing means 40 for the semiconductor junction, and a control unit 42 adapted to modify the value of the electrical biasing applied to the junction.

The junction waveguide 30 is a second ring waveguide of the optoelectronic device 1. It is positioned vertically above the resonant ring 20, along the axis Z, such that it extends in a plane parallel to the plane of the resonant ring 20. It extends along a longitudinal axis parallel to that of the resonant ring 20, and thus has a longitudinal form substantially identical to that of the resonant ring. The resonant ring 20 and the junction guide 30 are therefore superposed on one another, and are preferably coaxial.

The junction guide 30 has a bottom face 31*b* and an opposite top face 31*h*, the top face 31*h* being oriented toward the bottom face 21*b* of the resonant ring 20. The height $e_{gj}$ of the junction guide 30 is the mean distance between its bottom 31*b* and top 31*h* faces. The width $I_{gj}$ of the guide is the mean distance between its lateral flanks 32*i*, 32*e*. The height and the width are substantially constant along the longitudinal extent of the junction guide 30. It rests on a substrate 51 which participates in forming the cladding of the junction guide 30 with the support layer 50.

The inner 33*i* and outer 33*e* lateral parts extend radially from the junction guide 30. The guide 30 associated with the lateral parts 33*i* and 33*e* thus forms a rib waveguide. Thus, an inner lateral part 33*i* extends from the circumference of the inner lateral flank 32*i* toward the center of the ring 30, and an outer lateral part 33*e* extends from the circumference of the outer lateral flank 32*e*, toward the outside of the ring 30. The inner 33*i* and outer 33*e* lateral parts are produced in the same material as that of the junction guide 30, and are each doped according to an opposite conductivity type. Thus, the inner lateral part 33*i* can be N-doped and the outer lateral part 33*e* can be P-doped, or vice versa. The lateral parts 33*i*, 33*e* each rest on the substrate 51, but have a local height less than the height $e_{gj}$ of the junction guide 30, so as to avoid the spreading, at the level of the lateral parts 33*i*, 33*e*, of the optical supermode present in the junction guide 30 and the resonant ring 20. As an example, the height $e_{gi}$ of the guide 30 can be approximately 300 nm and the height of the lateral parts 33*i*, 33*e* can be approximately 150 nm, even less, for example 50 nm.

Moreover, inner 33*i* and outer 33*e* lateral parts are in contact with super-doped circumferential portions 34*i*, 34*e*. The inner 34*i* and outer 34*e* super-doped portions are produced in the same material as the lateral parts 33*i*, 33*e* and each exhibit the same type of conductivity as the lateral part 33*i*, 33*e* with which it is in contact. However, they exhibit a dopant density greater than that of the corresponding lateral part 33*i*, 33*e*. More specifically, the inner 34*i*, respectively outer 34*e*, super-doped portion is in contact with the inner 33*i*, respectively outer 33*e*, lateral part, and exhibits a doping level greater than the latter. These super-doped portions 34*i*, 34*e* make it possible to reduce the series resistance between the biasing electrodes 41*i*, 41*e* and the junction guide 30.

Finally, an inner biasing electrode 41*i* is in contact with the inner lateral part 33*i*, here by the inner super-doped portion 34*i*, and an outer biasing electrode 41*e* is in contact with the outer lateral part 33*e*, here by the outer super-doped portion 34*e*. Each biasing electrode 41*i*, 41*e* comprises an electrically conductive material which fills a trench produced in the cladding material 52 of the resonant ring 20 and in the support layer 50, which emerges on the top face of the inner 34*i* or outer 34*e* super-doped portion. Thus, an electrical potential difference, or biasing voltage U, can be applied to the semiconductor junction of the junction guide 30 by the electrodes 41*i*, 41*e*, via the lateral parts 33*i*, 33*e* and, here, super-doped portions 34*i*, 34*e*.

The junction guide 30 thus comprises a semiconductor junction which extends along the longitudinal axis of the waveguide, substantially parallel to the resonant ring 20. The semiconductor junction is of PN or PIN type, is even a capacitor junction, and is formed by an N-doped zone and a P-doped zone. In this example, the semiconductor junction is of PN type in as much as the N and P doped zones are in contact with one another, without being separated from one another by an intrinsic zone (i.e. a zone not intentionally doped) or by a dielectric zone. Thus, for purely illustrative purposes, the inner portion 34*i* can here be N+ super-doped, the inner lateral part 33*i* N doped, the outer lateral part 33*e* P doped, and the outer portion 34*e* P+ super-doped. The N-doped zone 34*i* of the junction guide 30 is in electrical continuity with the N-doped inner lateral part 33*i*, and the P-doped zone 35*e* is in electrical continuity with the P-doped outer lateral part 33*e*. A space charge zone (ZCE) is formed at the interface between the N and P doped zones of the junction guide 30, the width $I_{ZCE}$ of which depends on the biasing voltage U applied. The modification of the concentration of the carriers in the junction guide 30 upon the biasing of the junction can be performed by carrier depletion upon a reverse biasing, or by carrier injection, even by carrier accumulation in the case of a capacitive junction. Conventional examples of semiconductor junctions whose properties are modified by depletion, injection or accumulation of carriers are given in particular in the publication by Reed et al. entitled *Silicon optical modulators*, Nature photonics 4, 518-526 (2010).

The semiconductor junction, in the absence of biasing, is preferably situated substantially at the center of the junction guide 30. The optical properties of the junction guide 30 are intended to be modified, in particular the effective index associated with the optical mode, by a suitable biasing of the semiconductor junction, in order to modify the resonance wavelength $\lambda_{res}$ of the optical mode of the resonant ring 20.

For that, the junction guide 30 has optical and geometrical characteristics, as well as positioning with respect to the resonant ring 20, that are advantageously chosen so as to allow a good modal coupling between the two waveguides on the one hand, and to maintain an abnormal dispersion regime associated with the optical mode in the resonant ring 20 on the other hand.

Modal coupling should be understood to mean that the optical mode circulating in the resonant ring 20 extends spatially both in the resonant ring 20 and at least partly in the junction guide 30, then forming a supermode. More specifically, the component of the electrical field of the optical supermode exhibits a spatial distribution which covers the resonant ring 20 as well as at least a part of the junction guide 30. Thus, by the modal coupling between the two waveguides, the modification of the refractive index of the junction guide 30 will induce a modification of the effective index of the supermode and therefore a variation of the resonance wavelength $\lambda_{res}$, while preserving the abnormal dispersion regime of the supermode in the resonant ring 20. These properties, associated with the fact that the resonant ring is produced in a material with optical Kerr effect, make it possible to produce a spectral tuning of the resonance with the pump signal to obtain a solitonic regime.

The modal coupling between the resonant ring 20 and the junction guide 30 is ensured by their relative positioning on the one hand, and by the choice of their core materials on the other hand. The vertical spacing d between the junction guide 30 and the resonant ring 20, namely the distance between the top face 31h and the bottom face 21b, lies between a first value $d_{min}$ to preserve the abnormal dispersion in the resonant ring 20 and a second value $d_{max}$ greater than $d_{min}$ to allow the modal coupling. For illustration purposes, in particular in the case of a resonant ring 20 in AlGaAs and a junction guide 30 in silicon, the distance d lies between 75 nm and 200 nm. Furthermore, the core materials of the resonant ring 20 and of the junction guide 30 are chosen to be close to one another so as to allow the spatial spreading of the optical mode circulating in the resonant ring 20 at the level of the junction guide 30. More specifically, the refractive indices $n_{ar}$ and $n_{gj}$ of the core materials exhibit a deviation less than or equal to 0.5, such that $|n_{ar}-n_{gj}| \leq 0.5$. The refractive indices correspond here to the linear optical indices of the materials considered. Preferably, the junction guide 30 is produced in silicon, whose refractive index is equal to 3.48 at the wavelength of 1.55 µm, and the resonant ring 20 is produced in AlGaAs whose refractive index is equal to 3.44 for an aluminum concentration of approximately 20%. The refractive index is here the linear term of the refractive index. The junction guide can be produced in a material identical to that of the resonant ring or in a different material. The material of the junction guide 30 is preferably silicon, but can be SiN, such as $Si_3N_4$, or AlGaAs, GaAs, InGaAs, InGaAsP, InGaP, or the like. It can also be chosen from among the chalcogenides.

Moreover, the junction guide 30 has transverse dimensions, notably in width $I_{gj}$, chosen such that the dispersion regime remains abnormal in the resonant ring 20, for the variation of the concentration of charge carriers in the junction guide 30 to be able to impact the resonance wavelength $\lambda_{res}$ of the supermode in the resonant ring 20. The width $I_{gj}$ of the junction guide 30 thus lies between a first width $I_{min}$ to be able to modify the resonance wavelength $\lambda_{res}$ and a second width $I_{max}$ greater than $I_{min}$ to preserve the abnormal dispersion in the resonant ring 20, this width $I_{max}$ being less than that of the resonant ring 20. For illustration purposes, for a resonant ring 20 in AlGaAs of a width lying between 400 nm and 800 nm and a junction guide 30 in silicon, the width $I_{gj}$ lies between 200 nm and 500 nm, while being always less than the width $I_{ar}$ of the resonant ring 20.

The spectral tuning device 4 comprises electrical biasing means 40 for the semiconductor junction, adapted to apply an electrical potential difference to the junction in order to induce a modification of the concentration of charge carriers within the junction guide 30, thus causing a modification of the effective index of the supermode. In this example, the semiconductor junction is reverse-biased so as to induce a depletion of the carriers in the junction guide 30. For that, the biasing means comprise a voltage source, for which the value of the electrical voltage U applied to the semiconductor junction is intended to be modified. The voltage source 40 is linked to the biasing electrodes 41e, 41i, thus making it possible to bias the P and N doped zones of the junction via the inner 33i and outer 33e lateral parts.

The spectral tuning device 4 comprises a control unit 42, connected to the electrical biasing means 40, and coupled optically to the output 12 of the coupling guide 10, and adapted to modify the value U of the electrical voltage applied to the semiconductor junction until the solitonic regime is reached, that is to say until one or more dissipative temporal solitons are present in the resonant ring 20.

Preferably, the control unit 42 comprises at least an optical sensor and a computer. The optical sensor is optically coupled to the output 12 to receive a detection signal corresponding to at least a part of the output optical signal, and to determine a value of a parameter associated with the detected optical signal which is representative of the spectral tuning between the pump signal and the optical mode of the resonant ring 20, for the value U of the biasing voltage applied. The computer compares the measured value to a reference value representative of the presence of at least one dissipative temporal soliton in the resonant ring 20. The control unit 42 is then able to modify the value of the biasing voltage U until the determined value reaches the reference value, thus indicating that the solitonic regime is obtained.

As an example, the parameter representative of the spectral tuning can be the value of the transmission rate determined from the optical signal detected. The optical transmission rate of the optical microresonator 3 corresponds to the ratio of the intensity of the output optical signal to the intensity of the input optical signal. As indicated by the publication by Herr 2014, the transmission rate Tr decreases as the deviation between the resonance wavelength $\lambda_{res}$ and the pump wavelength $\lambda_p$ decreases, with $\lambda_{res} > \lambda_p$, which characterizes the blue-detuning regime. Then, from a minimum optical transmission value $Tr_{ref}$ which can then correspond to the reference value, the optical transmission Tr increases abruptly in a discrete manner, that is to say by levels, as the deviation between the resonance wavelength $\lambda_{res}$ and the pump wavelength $\lambda_p$ increases, with $\lambda_{res} < \lambda_p$, the pump wavelength $\lambda_p$ remaining substantially constant. The solitonic regime is then obtained. For that, the control unit 4 can comprise a photodiode coupled optically to the output 12, an oscilloscope, and a processor provided with a memory.

As a variant or in addition, the obtaining of the solitonic regime can be detected from the analysis of the noise associated with a radiofrequency (RF) signal reflecting interferences between neighboring frequency lines of the comb generated, even from the change of sign of a PDH (Pound-Drever-Hall) signal as a function of the biasing voltage V applied.

The operation of the optoelectronic device 1 according to the embodiment is now described, with reference to FIGS. 3A-3C and 4A-4C. In this example, the junction guide 30 is produced in silicon and the resonant ring 20 in AlGaAs. The semiconductor junction is reverse-biased such that the modification of the effective index of the optical mode supported by the resonant ring 20 and the junction guide 30 is obtained by modification of the carrier depletion zone in the junction.

The laser source 2 emits a continuous and monochromatic pump optical signal $S_{in}$ of wavelength $\lambda_p$, a spectrum of which is illustrated in FIG. 1B. The pump wavelength $\lambda_p$ therefore remains substantially constant over time. Furthermore, the biasing voltage U applied in reverse to the semiconductor junction exhibits a non-zero so-called initial value $U_{init}$, for which the junction exhibits a so-called initial space charge zone width $l_{ZCE,init}$ greater than the equilibrium space charge zone width $l_{ZCE,0}$ for which the voltage applied is zero.

The pump signal $S_{in}$ is transmitted by the coupling waveguide 10 toward the output 12. In as much as the waveguide 10 is single-mode in this example, the pump signal corresponds to a fundamental mode of the guide 10, for example $TE_{00}$.

Through optical coupling of evanescent type between the first waveguide 10 and the resonant ring 20, the pump signal $S_{in}$ resonantly excites a fundamental mode of the resonant ring 20, here the mode $TE_{00}$. More specifically, the optical coupling is produced by the phase tuning between the fundamental mode $TE_{00}$ of the first guide and the fundamental mode $TE_{00}$ of the resonant ring 20. Thus, a large part or almost all of the optical signal $S_{in}$ is transmitted from the coupling guide 10 into the resonant ring 20.

The optical mode passing through the resonant ring 20 spreads spatially so as to cover, by modal coupling, both the resonant ring 20 and the junction guide 30 superposed on one another, and thus forms a supermode. The modal coupling is possible because of the value of the distance d vertically separating the resonant ring and the junction guide 30 on the one hand, and by the low deviation between the refractive index $n_{ar}$ of the resonant ring 20 and the refractive index $n_{gj}$ of the junction guide 30, preferably such that $|n_{ar} - n_{gj}| = |\Delta n| \leq 0.5$, on the other hand. The effective index $n_{eff}$ associated with the supermode thus depends on the refractive indices $n_{ar}$ and $n_{gj}$ and on the geometrical dimensions of the waveguides 20, 30. In as much as the refractive index $n_{gj}$ depends on the biasing voltage U, the effective index $n_{eff}$ depends also on the biasing voltage U.

The supermode exhibits an effective resonance wavelength $\lambda_{res}$ which is of triangular non-lorentzienne form because of the third order non-linear optical properties of the material of the resonant ring 20. By definition, the mth order resonance wavelength $\lambda_{res}$ is defined by the relationship: $2\pi m_{eff} = m\lambda_{res,m}$, here in the case where the resonant ring 20 forms a circle of radius r, $n_{eff}$ being the effective index of the supermode. The resonance wavelength $\lambda_{res}$ is greater than the so-called linear resonance wavelength $\lambda_{lin}$ for the same order m, the latter corresponding to the case where the material of the resonant ring 20 is optically linear. In as much as the effective index $n_{eff}$ depends on the biasing voltage U, the resonance wavelength $\lambda_{res}$ depends also on the biasing voltage U.

Figure 3C:
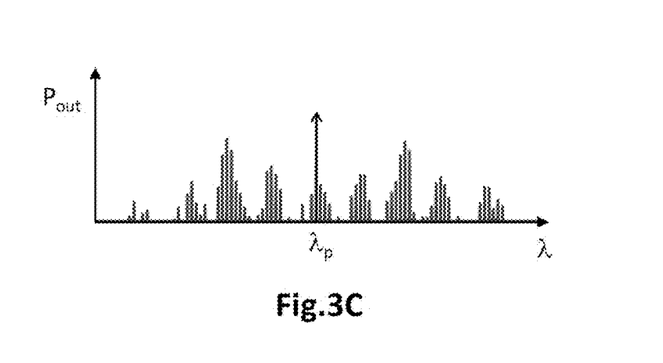

Preferably, the pump wavelength $\lambda_p$ has been chosen to be less than the effective resonance wavelength $\lambda_{res}$ at the voltage $U_0$, and can have been chosen to be close, even equal to, the linear resonance wavelength $\lambda_{lin}$. Also, as illustrated by FIG. 3B, the pump signal and the resonant mode initially exhibit, for $U_{init}$, a spectral tuning in the blue (blue-detuning). The pump signal however excites a resonant mode of the resonant ring 20, which makes it possible to generate a frequency comb by cascaded four-wave mixing, the comb not however being coherent in as much as the solitonic regime Rs is not reached, as represented in FIG. 3C.

The spectral tuning device 4 then applies a reduction of the resonance wavelength $\lambda_{res}$ with respect to the pump wavelength $\lambda_p$ which remains substantially constant, by applying a continuous reduction, as an absolute value, of the biasing voltage U at the semiconductor junction, until one or more dissipative temporal solitons are formed in the resonant ring 20.

In this example, the formation of dissipative temporal solitons is detected from the trend of the value of the transmission rate Tr of the optoelectronic device 1. Using a detection waveguide 43, all or part of the output signal is received then transmitted to a photodiode which supplies the intensity of the optical signal detected. An oscilloscope records the value of the intensity of the signal detected as a function of the value of the biasing voltage U. A signal of the transmission rate Tr as a function of the biasing voltage U is thus deduced therefrom. Thus, for the initial voltage applied $U_{init}$, an initial transmission rate $Tr_{init}$ is obtained.

In this example, the spectral tuning device 4 applies a reverse biasing voltage U to the semiconductor junction, whose value U, lying between the initial value and the equilibrium value $U_0$, decreases progressively as an absolute value. That is reflected by a reduction of the width $l_{ZCE}$ of the space charge zone (FIG. 4A), which reflects a progressive increase in the concentration of the carriers in the semiconductor junction. The refractive index $n_{gj}(U)$ of the junction guide 30 is modified, which here leads to a reduction of the effective index $n_{eff}(U)$ associated with the supermode, and therefore a reduction of the resonance wavelength $\lambda_{res}(U)$. The oscilloscope records the drop in the transmission rate Tr(U) as the voltage U decreases as an absolute value, which indicates that the spectral tuning between the pump signal and the resonant mode remains in the blue (blue-detuning).

Figure 4A:
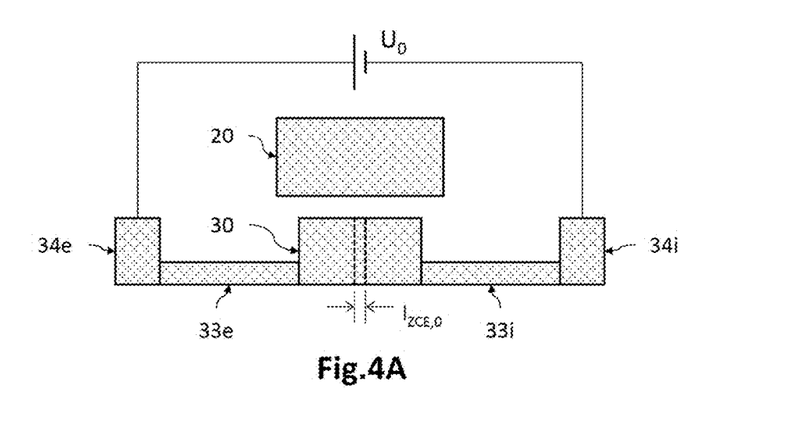
Figure 4B:
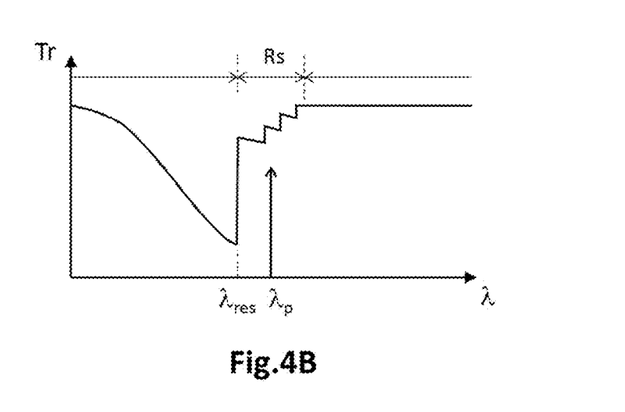

However, from a value U less than or equal to a reference value $U_{ref}$, as an absolute value, the effective resonance wavelength $\lambda_{res}(U \geq U_{ref})$ becomes less than the pump wavelength $\lambda_p$, that is to say that the spectral tuning is in the red (red-detuning), as illustrated in FIG. 4B. The oscilloscope then detects an increase by level of the transmission rate Tr(U), a sign that the solitonic regime is reached. The formation of dissipative temporal solitons is in fact effective when the spectral tuning is in the red, in as much as the dispersion regime remains abnormal despite the presence of the junction guide 30. As described previously, the dimensioning of the junction guide 30, in particular its width $I_{gj}$ relative to that of the resonant ring 20, and the value of the distance d make it possible to keep the dispersion of the supermode abnormal.

Figure 4C:
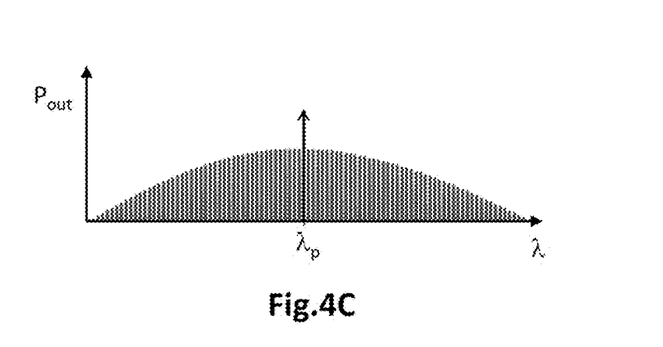

When the solitonic regime is reached, the spectral tuning device 4 stops the reduction of the biasing voltage U. The value of the voltage then lies between the reference value $U_{ref}$ and the equilibrium value $U_0$. However, the number of solitons present in the resonant ring 20 can be controlled as a function of the value U of the biasing voltage applied. More specifically, the increase by levels of the transmission rate reflects the decrease in the number of solitons present in the resonant ring 20. It is also possible to detect the full coherence of the frequency comb by comparing the spectral envelope of the frequency comb generated with respect to the $\sin h^2$ function (FIG. 4C).

Thus, at the output 12 of the wavelength 10, a coherent frequency comb is obtained. It exhibits a constant free spectral interval, that is to say a constant value of spacing between the successive frequency lines, as well as a low frequency and/or amplitude noise. Furthermore, when a single dissipative temporal soliton passes through the resonant ring, the amplitude of the frequency lines is weighted by a spectral envelope of hyperbolic sine squared ($\sin h^2$) type centred on the pump wavelength $\lambda_p$, thus reflecting the coherence of the frequency comb.

The optoelectronic device 1 is thus able to produce a spectral tuning between the pump signal and the resonant mode presented in the optical microresonator 3 to reach the solitonic regime Rs, and thus generate a quasi-coherent or coherent frequency comb. Unlike the example of the prior art mentioned previously, the spectral tuning device 4 does not comprise a tunable laser which is able to produce a sufficiently fine and resonance scanning. Such a tunable laser presents the drawbacks of not being able to be simply integrated in the support substrate and can be bulky. It may also be not very accurate, which can be reflected by a difficulty in addressing the solitonic regime. In effect, as shown by FIG. 1D, the solitonic regime exists only for a narrow width of the resonance spectrum.

On the other hand, the spectral tuning is ensured by keeping the pump wavelength $\lambda_p$ substantially constant and by using a junction guide positioned facing the resonant ring 30 to allow the formation of a supermode, whose effective index is modified by the biasing of the semiconductor junction. The modification of the effective index, and therefore of the resonance wavelength $\lambda_{res}$ of the supermode, makes it possible to switch from the blue-detuning to the red-detuning, a necessary condition for the formation of dissipative temporal solitons. Thus, the spectral tuning is simplified, rapid and accurate, via a spectral tuning device that can easily be integrated in a substrate, particular of SOI type.

Moreover, when the resonant ring 20 is in a III-V material with optical Kerr effect, and the junction guide 30 is in silicon, the resonant ring 20 exhibits an abnormal dispersion regime for transverse thickness and width dimensions such that it remains single-mode. That makes it possible to avoid the presence of several optical modes in the resonant ring 20, the possible interference of which are likely to degrade the formation of the Kerr-type dissipative temporal solitons.

For purely illustrative purposes, the optoelectronic device 1 can comprise a laser source 2 adapted to emit a monochromatic (continuous) pump optical signal, of a wavelength that is substantially constant over time, for example equal to 1.55 µm. The pump signal is guided in the coupling waveguide 10, the latter being single-mode and supporting the fundamental mode $TE_{00}$.

The resonant ring 20 is produced in AlGaAs which is a III-V material with optical Kerr effect for which the value of the non-linear index $n_2$ is high. Thus, the optical power necessary for the generation of a frequency comb by cascaded four-wave mixing is low, less than 10 mW, and remains less than the two-photon absorption optical power of the silicon forming the junction guide 30. It rests on a support layer 50 of silicon oxide $SiO_x$, for example $SiO_2$, and takes the form of a circle of radius r of approximately 12.5 µm, a thickness $e_{ga}$ of approximately 400 nm and a width $I_{ga}$ of approximately 630 nm. The resonant ring 20 is therefore single-mode at 1.55 µm and here supports the fundamental mode $TE_{00}$. The resonant ring 20 exhibits a chromatic dispersion parameter D associated with the fundamental mode $TE_{00}$ at 1.55 µm equal to 764.2 ps/(nm·km) in the absence of junction guide 30. The resonant ring 20 is surrounded by a cladding produced here in silicon oxide $SiO_2$.

Moreover, the junction guide 30 is produced in Si. It is superposed on the resonant ring 20 in the direction −Z, and takes the form of a circle also of 12.5 µm radius. The junction guide 30 has a thickness $e_{gj}$ of approximately 300 nm and the width $I_{gj}$ is approximately 280 nm. The distance d separating the junction guide 30 from the resonant ring 20 is approximately 100 nm. Thus, the dispersion of the supermode remains clearly abnormal despite the presence of the junction guide 30, thus allowing the formation of dissipative temporal solitons.

In this example, the semiconductor junction is reverse-biased, thus causing a controlled depletion of the carriers in the space charge zone. More specifically, the ZCE exhibits an initial width $I_{ZCE,init}$ at $U_{init}$ which decreases with the drop in the value U of the biasing voltage (as an absolute value). Furthermore, the initial voltage $U_{init}$ applied is chosen to entirely deplete the junction guide 30, such that $I_{ZCE,init} \sim I_{gj}$, thus making it possible to increase the spectral shift of the resonance $\Delta\lambda_{res} = \lambda_{res}(U_0 = 0) - \lambda_{res}(U)$, and thus facilitate the spectral tuning in the red between the pump signal and the resonant mode, while remaining less than the breakdown voltage so as not to damage the semiconductor junction. In this example, the density of acceptor and donor dopants in the inner 33i and outer 33e lateral parts are $N_a = N_d = 1.25 \times 10^{17}$ cm$^{-3}$.

Figure 5A:
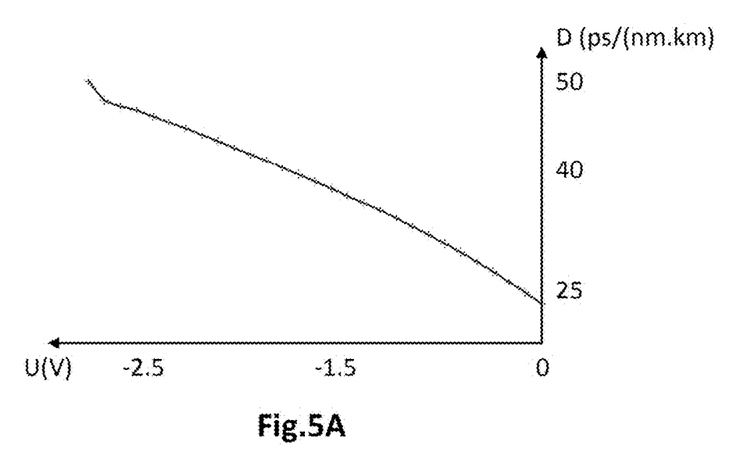
FIG. 5A illustrates an example of trend of the dispersion parameter D associated with the resonant optical mode as a function of the value of the biasing voltage U applied.

As illustrated in FIG. 5A, the value of the chromatic dispersion parameter D of the optical mode in the resonant ring 20 depends on the biasing voltage U applied to the semiconductor junction. Thus, in this example, the parameter D varies between a value of 24 ps/(nm·km) at the zero equilibrium voltage $U_0$, and a value of 50 ps/(nm·km) at an initial voltage $U_{init}$ of approximately −2.8 V. It remains positive whatever the value of the voltage U lying between $U_{init}$ and $U_0$, thus reflecting the fact that the dispersion remains abnormal during the spectral tuning phase for the solitonic regime to be obtained. Thus, the presence of the junction guide 30 and the application of the biasing voltage do not disturb the formation of the dissipative temporal solitons in the resonant ring 20.

Figure 5B:
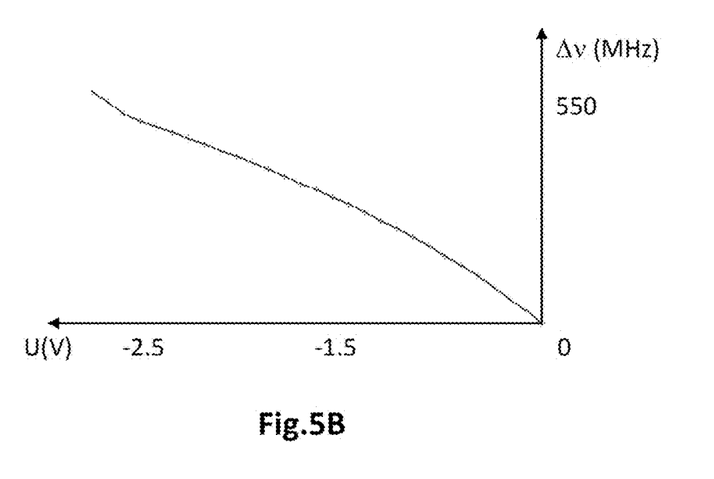
FIG. 5B illustrates an example of value of the shift Δν in frequency of the effective resonance as a function of the value of the biasing voltage U applied.

FIG. 5B illustrates an example of a trend of the value of the shift $\Delta v_{res}$ in frequency of the resonance as a function of the biasing voltage U. The shift in frequency $\Delta v_{res}$ of the resonance is defined as the deviation between the resonance frequency $w_{res}(U_0)$ at zero voltage $U_0$ and the resonance frequency $w_{res}(U)$ at non-zero voltage U: $\Delta v_{res}(U) = w_{res}(U) - w_{res}(U_0)$. In this example, the semiconductor junction is reverse-biased, which leads to a depletion of the carriers. Thus, the shift in frequency Δν is here of the order of 550 MHz when the biasing voltage U reaches a value of approximately −2.8 V.

Particular embodiments have just been described. Different variants and modifications will become apparent to the person skilled in the art.

Thus, the resonant mode present in the resonant ring 20 mentioned previously is the TE (transverse electric) mode but it could also be the TM (transverse magnetic) mode. In this case, the figure of merit of the resonant ring 20 can be higher in as much as the TM supermode perceives only the roughness of the bottom and top faces of the waveguides since it oscillates according to the axis Z and not in the plane XY. Now, the bottom and top faces of the waveguides exhibit a lesser roughness, at least by an order of magnitude, than that of the lateral flanks.

The invention claimed is:

1. An optoelectronic device for generating a frequency comb, comprising:
   a laser source configured to emit a pump optical signal, which is continuous, monochromatic, and has a time-constant pump wavelength;
   a ring optical microresonator, comprising
      a coupling waveguide, comprising an input optically coupled to the laser source, and an output configured to supply the generated frequency comb; and
      a resonant ring, comprising a first ring waveguide coupled optically to the coupling waveguide to generate an optical mode in the resonant ring at a resonance wavelength, the resonant ring being formed of a third order optically non-linear material which exhibits a refractive index and transverse dimensions such that the resonant ring exhibits an abnormal dispersion regime associated with said optical mode; and
   a spectral tuning device configured to tune the resonance wavelength relative to the pump wavelength to form at least one dissipative temporal soliton in the resonant ring, the spectral tuning device comprising
      a junction guide, comprising a second ring waveguide arranged facing the resonant ring so as to be longitudinally coupled optically to the resonant ring, the junction guide being formed of a material whose refractive index exhibits a deviation with respect to the refractive index of the material of the resonant ring, allowing modal coupling between the resonant ring and the junction guide, the junction guide including a semiconductor junction extending parallel to the resonant ring;
      a voltage source configured to apply a biasing voltage to the semiconductor junction; and
      a control processor, connected to the voltage source and coupled optically to the output, the control processor being configured to modify the biasing voltage to cause a modification of an effective index of the optical mode and a modification of the resonance wavelength, until the at least one dissipative temporal soliton is formed in the resonant ring.

2. The optoelectronic device as claimed in claim 1, wherein the control processor is configured
   to detect an optical signal at the output,
   to determine a value of a parameter representative of a spectral tuning between the pump optical signal and an optical mode of the resonant ring at the applied biasing voltage, and
   to induce a modification of the applied biasing voltage until the value of said parameter reaches a reference value representative of a presence of at least one dissipative temporal soliton in the resonant ring.

3. The optoelectronic device as claimed in claim 1, wherein the material of the junction guide is silicon.

4. The optoelectronic device as claimed in claim 1, wherein the material of the resonant ring is a III-V semiconductor compound, a IV element, or a IV compound.

5. The optoelectronic device as claimed in claim 1, wherein the material of the resonant ring is chosen from AlGaAs, GaAs, GaAsP, InGaP, InGaAsP, and InGaAs.

6. The optoelectronic device as claimed in claim 1, wherein the resonant ring is single-mode at the resonance wavelength.

7. The optoelectronic device as claimed in claim 1, wherein a difference between the refractive index of the material of the resonant ring and the refractive index of the material of the junction guide is less than or equal to 0.5.

8. The optoelectronic device as claimed in claim 1, wherein a mean distance separating the resonant ring and the junction guide, along an axis orthogonal to a plane on which the resonant ring extends, is between 75 nm and 200 nm.

9. The optoelectronic device as claimed in claim 1, wherein a mean width of the junction guide is less than the mean width of the resonant ring.

10. The optoelectronic device as claimed in claim 9, wherein the mean width of the junction guide is between 200 nm and 500 nm and the mean width of the resonant ring is between 400 nm and 800 nm.

11. The optoelectronic device as claimed in claim 1, wherein the material of the resonant ring and the material of the junction guide are respectively surrounded by a silicon oxide cladding.

12. A method for generating a frequency comb by an optoelectronic device as claimed in claim 1, comprising:
   emitting by the laser source of the monochromatic and continuous pump optical signal at the time-constant pump wavelength, said pump wavelength being chosen to form an optical mode in the resonant ring at the resonance wavelength;
   biasing the semiconductor junction by a non-zero biasing voltage, so as to provoke a modification of a concentration of charge carriers within the junction guide, causing the modification of the effective index of the optical mode present in the resonant ring and the modification of the resonance wavelength;
   detecting an optical signal at the output, and determining, from the optical signal detected, a value of a parameter representative of a spectral tuning between the pump optical signal and the optical mode of the resonant ring; and
   modifying the value of the biasing voltage, until the determined value of said representative parameter reaches a reference value representative of the presence of at least one dissipative temporal soliton in the resonant ring.

13. The method as claimed in claim 12, wherein, at an initial value of the biasing voltage, the pump wavelength is less than the resonance wavelength.

14. The method as claimed in claim 13, wherein, in the modifying, the modification of the value of the biasing voltage relative to the initial value leads to a reduction of the resonance wavelength until the resonance wavelength is less than the pump wavelength.

15. The method as claimed in claim 12, further comprising determining a transmission rate of an optical transmission of the optical microresonator, the reference value being a minimum value of the transmission rate of the optical transmission when the value of the biasing voltage increases.

* * * * *